US010013703B2

(12) United States Patent
LaMontagne

(10) Patent No.: US 10,013,703 B2
(45) Date of Patent: Jul. 3, 2018

(54) OBJECTIVE BASED ADVERTISEMENT PLACEMENT PLATFORM

(71) Applicant: Trivver, Inc., Huntington Beach, CA (US)

(72) Inventor: Joel LaMontagne, Huntington Beach, CA (US)

(73) Assignee: Trivver, Inc., Huntington Beach, CA (US)

( * ) Notice: Subject to any disclaimer, the term of this patent is extended or adjusted under 35 U.S.C. 154(b) by 0 days.

(21) Appl. No.: 15/283,166

(22) Filed: Sep. 30, 2016

(65) Prior Publication Data

US 2018/0096380 A1  Apr. 5, 2018

(51) Int. Cl.

| G06Q 30/02 | (2012.01) |
| G06Q 50/00 | (2012.01) |
| G06T 15/20 | (2011.01) |
| G06T 7/00 | (2017.01) |
| G06K 9/62 | (2006.01) |
| G06T 7/60 | (2017.01) |
| G06K 9/52 | (2006.01) |

(52) U.S. Cl.
CPC .......... *G06Q 30/0246* (2013.01); *G06K 9/52* (2013.01); *G06K 9/6215* (2013.01); *G06K 9/6267* (2013.01); *G06Q 30/0277* (2013.01); *G06Q 50/01* (2013.01); *G06T 7/0004* (2013.01); *G06T 7/60* (2013.01); *G06T 15/20* (2013.01); *G06T 2200/04* (2013.01); *G06T 2207/30108* (2013.01)

(58) Field of Classification Search
CPC ................................................. G06Q 30/0246

USPC ....................................................... 705/14.45
See application file for complete search history.

(56) References Cited

U.S. PATENT DOCUMENTS

| 6,828,966 | B1 | 12/2004 | Gavriliu et al. |
| 9,443,352 | B1 | 9/2016 | Glover et al. |
| 2002/0033845 | A1 | 3/2002 | Elber et al. |
| 2006/0287105 | A1 | 12/2006 | Willis |
| 2007/0060345 | A1 | 3/2007 | Edwards |
| 2007/0060346 | A1 | 3/2007 | Edwards |
| 2007/0072676 | A1 | 3/2007 | Baluja |
| 2007/0078706 | A1 | 4/2007 | Datta et al. |

(Continued)

OTHER PUBLICATIONS

Vire AR/VR tracking [available at http://vire.co/tracking], publication date unknown.

*Primary Examiner* — Daniel M Sorkowitz
(74) *Attorney, Agent, or Firm* — Chhabra Law Firm, PC

(57) ABSTRACT

Using various embodiment, methods and systems to implement an objective based advertisement placement platform are described. In one embodiment, a method and system to display advertisements in three dimensional (3D) online environment based on an objective of an advertiser is disclosed. A computing device receives the objective of the advertiser. In one embodiment, the advertiser objective includes determining when to stop displaying a branded smart object (BSO) to a user in the 3D online environment, the objective including an engagement rule. The computing device can further determine whether the advertiser's objective has been achieved by a user, the determining including evaluating a user engagement score (UES) and comparing the UES with an advertiser's engagement rule. If the advertiser's objective is achieved (or met) by the user, the BSO is not displayed to the user for a predetermined period of time.

24 Claims, 10 Drawing Sheets

(56) References Cited

U.S. PATENT DOCUMENTS

| | | |
|---|---|---|
| 2009/0138813 A1 | 5/2009 | LaMontagne |
| 2010/0030640 A1 | 2/2010 | van Datta et al. |
| 2010/0205035 A1 | 8/2010 | Baszucki et al. |
| 2010/0217666 A1* | 8/2010 | Belenguer .......... G06F 17/30905 705/14.45 |
| 2013/0029762 A1 | 1/2013 | Klappert |
| 2013/0124311 A1 | 5/2013 | Sivanandan et al. |
| 2013/0158965 A1 | 6/2013 | Beckman |
| 2014/0114742 A1* | 4/2014 | Lamontagne ...... G06Q 30/0242 705/14.41 |
| 2014/0149903 A1 | 5/2014 | Ahn et al. |
| 2015/0035822 A1 | 2/2015 | Arsan et al. |
| 2015/0035823 A1 | 2/2015 | Arsan et al. |
| 2016/0189223 A1 | 6/2016 | McLeod et al. |
| 2016/0293133 A1 | 10/2016 | Dutt |
| 2017/0132567 A1 | 5/2017 | Glunz |
| 2017/0228943 A1 | 8/2017 | Arsan et al. |

* cited by examiner

FIG. 1    100

Formula 1:

$$VPE = \sum X_n + \sum Y_m$$

926  FIG. 9B

Formula 2:

$$BP_x = \frac{\text{Ad Budget (\$)}}{VPE}$$

927  FIG. 9C

OBJECTIVE BASED ADVERTISEMENT PLACEMENT PLATFORM

FIELD OF THE INVENTION

Embodiments of the present invention relates generally to placement of advertisements in an online environment. More particularly, embodiments of the invention relate to methods, systems, and devices, that can assist advertisement placement based on an objective of a party (e.g., advertiser, client, etc.).

BACKGROUND OF THE INVENTION

Digital advertising currently requires creating specific and customized content (e.g., images, videos, text, etc.) for each advertiser individually, and placing them directly at various forms of digital platforms (e.g., websites, games, etc.). Conventionally, once the user visits a website/web-page, a third party cookie is saved locally at the client machine and each time the client revisits the webpage/website the cookie is transmitted back to the third party server. Furthermore, such systems require that the advertiser provide content for the advertisement, however, the advertiser has no control where or how the content would be displayed, except for providing keywords to the advertising system. The issue is further exacerbated in mobile software applications ('Apps') where third party cookies are either not allowed or are severely restricted.

Further, such advertising systems often result in ineffective advertising due to the inherent limitations of keyword based advertising. Furthermore, fake or mistaken clicks occur regularly, which are further detrimental to the advertiser's interest. Such systems have no means of determining, in advance, if its advertising at a publisher's digital platform would generate in meaningful results. Thus, conventional advertising platforms often result in wasteful and inefficient advertising.

Therefore, efficient systems, methods, and techniques are needed that allow a developer, publisher, or advertiser to overcome these limitations without the use of cookies. Such systems should further permit the developer or publisher to provide information that can help an advertiser determine the intended audience of the publisher's content. Further, such systems should be able to provide the advertiser the ability to control when their content is displayed to the user.

SUMMARY OF THE DESCRIPTION

Using various embodiment, methods and systems to implement an objective based advertisement placement platform are described. In one embodiment, a method and system to display advertisements in three dimensional (3D) online environment based on an objective of an advertiser is disclosed. A computing device receives the objective of the advertiser. In one embodiment, the advertiser objective includes determining when to stop displaying a branded smart object (BSO) to a user in the 3D online environment, the objective including an engagement rule. In one embodiment, the engagement rule can be provided by the advertiser, generated by the system described herein, or a combination thereof. The engagement rule provides the conditions upon which it is determined that the advertiser's objective has been complete. The computing device can further determine whether the advertiser's objective has been achieved by a user, the determining including evaluating a user engagement score (UES) and comparing the UES with the engagement rule.

In one embodiment, the UES is derived, at least in part, from Smart Object Metric Data (SOMD) transmitted from a smart object manager residing within the 3D online environment that can receive trigger event data from a smart object. A smart object, can be a generic smart object (GSO) or a BSO and includes programmable trigger events that can result in the generation of the SOMD based on user interaction with, or viewability of, the smart object. In another embodiment, upon determining when to stop displaying a BSO to a user in the 3D online environment, the computing device can be configured to prevent displaying the BSO on the user's interface. In one embodiment, preventing the display of the BSO occurs across multiple 3D environments or platforms on one or more user interfaces associated with the user. In another embodiment, preventing the display BSO occurs for a predetermined period of time. In yet another embodiment, the computing device can be configured to display another BSO associated with the advertiser for the predetermined period of time. In one embodiment, the BSO can be placed within the 3D online environment by a game developer as a generic smart object (GSO), the GSO comprising a generic asset, and the advertiser can replace the generic asset with a branded asset to generate the BSO, the branded asset graphically representing a branded product or service offered by the advertiser.

In one embodiment, the advertiser can provide the same objective for the BSO across multiple 3D environments or platforms for a plurality of users. In one embodiment, the UES includes data related to a purchase action, a social media like action, a social media post action, or a get coupon action, or a combination thereof.

In yet another embodiment, the UES is represented by an alpha-numeric string that represents a collective value for the user engagement data related to the BSO. The UES can, in one embodiment, be at least represented by a string comprising eUx.vy.ts.in.pm where e represents a user engagement identifier related to the smart object, U represents a value for the number of engagement features displayed to the user, x represents a number of engagement features that were utilized by the user, v represents a viewability identifier related to the smart object, y represents a size of the BSO with respect to at least one display of the user interface, t represents a time identifier related to the smart object, s represents a number of seconds the user interacted with, or viewed, the BSO, i represents a user intent identifier related to the smart object, n is a variable representing whether the intent was fulfilled, p represents a purchase identifier related to the smart object, and m is a variable representing whether the user purchased the service or product represented by the BSO, and wherein the period symbol (.) represents a separator identifier (delimiter) between the various data transmitted within the UES related to the smart object.

In one embodiment, the advertiser can select engagement features that are to be displayed to a user interacting with a smart object. In this embodiment, the system described herein also include a method to estimate or predicting the approximate user interaction/viewability that can be reached in an advertisement campaign based on the advertiser's budget and viewability and selected engagement features of a smart object.

BRIEF DESCRIPTION OF THE DRAWINGS

The present invention is illustrated by way of example and not limitation in the figures of the accompanying drawings in which like references indicate similar elements.

FIGS. 9B and 9C illustrate the formulas that can be implemented in the flowchart of FIG. 9A, according to one embodiment of the present invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Figure 1:
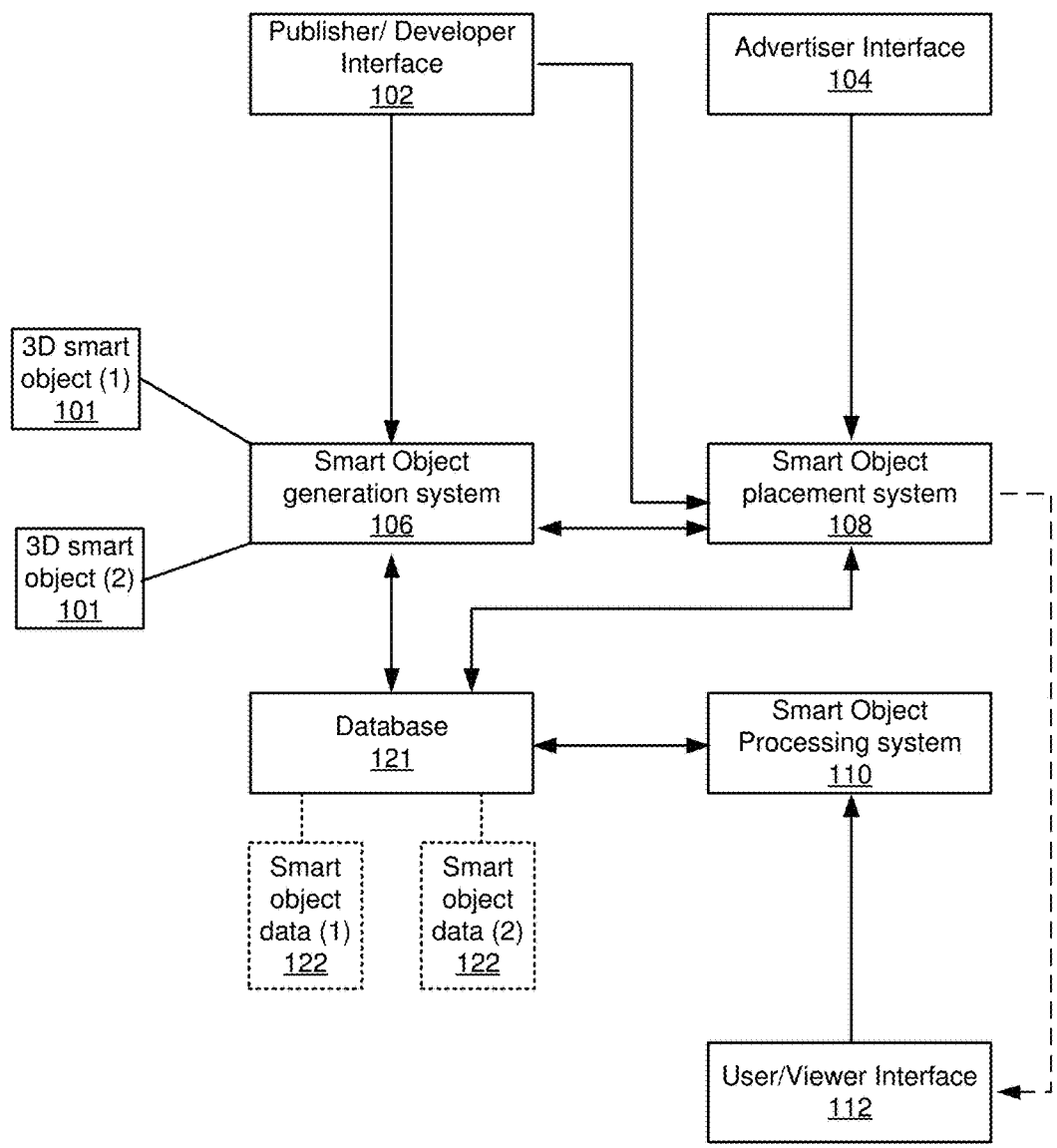
FIG. 1 illustrates a block diagram of a general system architecture that can generate and implement smart objects to process advertising related relevant information, according to one embodiment of the present invention.

FIG. 1 illustrates a block diagram 100 of a general system architecture that can generate and implement smart objects to process advertising related relevant information, according to one embodiment of the present invention. Smart objects, in one embodiment, can be used to generate generic content (banner/billboard, videos, and/or 3D assets) that can optionally be replaced with branded content from an advertiser within a variety of digital platforms and measure the user performance with both the generic and branded content across the digital platform. In one embodiment, a smart object comprises an asset encompassed in a transparent 3D asset placeholder that dictates the maximum X-Axis, Y-Axis, and Z-Axis dimensions of an asset/object and/or and understands the scaling dimensions that takes up a specific shape in a 3D digital environment. The asset within the 3D asset placeholder provides a visual representation of the smart object. The asset can be, in one embodiment, a 3D representation of geometric data, where the asset within the 3D asset placeholder provides a visual representation of the smart object. A smart object comprises an asset that can be any media content such as, 3D non-active assets, assets, video, audio, multi-media object, any general 3D representation of geometric data, or a combination thereof. In various embodiments, smart objects can be used for services related to advertising, notification, or generally for any service that can personalize a viewer's environment with 3D content that is relevant to each viewer.

After smart object 101 has been generated, it can be placed into a three dimensional environment by smart object placement system 108. Various exemplary embodiments of generating smart object 101 in a 3D environment are disclosed in U.S. patent application Ser. No. 15/209,679, filed on Jul. 13, 2016, and embodiments to display smart objects within a 3D environment disclosed in U.S. patent application Ser. No. 15/209,688, filed on Jul. 13, 2016 can be employed, in whole or in part, with the present invention. Further, various exemplary embodiments of displaying information associated with smart objects, disclosed in U.S. patent application Ser. No. 15/236,323, filed on Aug. 12, 2016 can also be employed, in whole or in part, with the present invention. As a result, the above-identified disclosures are incorporated herein by reference in their entirety. It should be noted, in the above stated disclosures, a smart object has also been referred to as a 3D digital smart object.

As illustrated, publisher or developer can, using publisher interface 102, request the smart object placement system 108 to place smart object 101 in a three dimensional environment, as described further herein. 3D digital smart objects (also referred to herein as smart objects), in one embodiment, can be used to generate generic content (banner/billboard, videos, and/or 3D assets) that can optionally be replaced with branded content from an advertiser within a variety of digital platforms and measure the user performance with both the generic and branded content across the digital platform. In one embodiment, a smart object comprises an asset encompassed in a transparent 3D asset placeholder that dictates the maximum X-Axis, Y-Axis, and Z-Axis dimensions of an asset/object and/or and understands the scaling dimensions that takes up a specific shape in a 3D digital environment. The asset within the 3D asset placeholder provides a visual representation of the smart object. The asset can be, in one embodiment, a 3D representation of geometric data, where the asset within the 3D asset placeholder provides a visual representation of the 3D digital smart object. A smart object, in one embodiment, comprises an asset that can be any media content such as, 3D non-active assets, assets, video, audio, multi-media object, any general 3D representation of geometric data, or a combination thereof. In various embodiments, 3D digital smart objects can be used for services related to advertising, notification, or generally for any service that can personalize a viewer's environment with 3D content that is relevant to each viewer. Smart objects can further include programmable trigger events (scripts) using which the smart object can transmit information to a smart object manager. The smart object manager is a background process that is included within the 3D environment and can transmit user action or interaction associated with a smart object to the system, as described herein. The smart object manager, in one embodiment, transmits the information received from the smart objects to the system, as discussed herein, for calculation of various metrics that can assist in determining user behavior with a smart object and to determine whether an objective of the advertiser has been met based on user action (or interaction) with the smart object. The metric data, also referred to herein as smart object metric data (SOMD), can be generated using data transmitted from the smart object to the smart object manager. In one embodiment, SOMD is generated from the smart object and transmitted to the smart object manager, in yet another embodiment, SOMD is generated by the smart object manager using information provided by the smart object. In yet another embodiment, smart object manager includes scripts and determines SOMD associated with each smart object independently (that is, no information is transmitted from the smart object, but rather the smart object manager keeps track of the smart objects within the user's viewport or screen and collects data based on user action/interaction/viewability with each smart object. In yet another embodiment, a hybrid system is implemented with the smart object manager implemented using a combination of techniques described herein (above). That is, the smart object manager can receive data transmitted from the smart object to generate SOMD.

Smart object placement system 108 can request the publisher's input to select a smart object (generated by smart object generation system 106) and save the coordinates, including game identification data, smart object identification data, smart object category/type data, publisher/developer identification data, polygon counts, shading and lighting of smart object, and location/scene identification data. Smart object placement system 108 can interact with the developer using various 3D game development environments. In one embodiment, smart object placement system 108 can also be directly interact with using user/viewer interface 112. Smart object placement system 108 can, in one embodiment, also receive an asset from the publisher and/or advertiser and transmit the information to smart object generation system 106 for the generation of a BSO. Generally, a 3D environment intending to implement the techniques described herein would need to provide SDK(s), API(s), or any other means using which smart object placement system 108 can interact with the 3D environment's development interface. Thus, in one embodiment, publisher interface 102 can be a game development environment (e.g., Unity® engine, Unreal® engine, Torque 3D® engine, Adobe® Air, etc.). In another embodiment, publisher interface 102 can be any 3D development environment, as known to a person having ordinary skill in the art. However, it should be noted, the invention described herein is not intended to be limited to any particular 3D development environment. Therefore, smart object 101 has been generated by smart object generation system 106, the publisher can request the smart object 101 be placed in a 3D environment by requesting the smart object placement system 108, using a SDK or API set provided to the developer by the 3D environment.

In another embodiment, a system administrator of the smart object placement system 108 can present predetermined smart objects (to the developer) that can be placed within a three dimensional environment using smart object placement system 108. Generally, smart object placement system 108 can be any computing engine that can interact with a 3D environment and determine the location (within the environment) where the smart object has been placed by the developer/publisher, and save it as placement data. Smart object placement system 108 can further associate the placement data of smart object 101 in a 3D environment with 3D environment identification data that identifies the digital platform using smart object 101. In one embodiment, the publisher or developer can place smart object 101 as a GSO. In another embodiment, the publisher or developer can place smart object 101 as a BSO. When the developer/publisher places a GSO in the 3D environment, an advertiser, in one embodiment, using advertiser interface 104 can interact with smart object placement system 108 to replace the publisher provided asset with a branded asset to generate a BSO. In another embodiment, a polygon count restriction is implemented to ensure the asset provided by the advertiser is compatible with the GSO implementation of the developer to assist in a seamless transition, including ensuring that the download time remains the same (as that of the GSO) when the GSO is replaced by a BSO. In yet another embodiment, the developer/publisher can provide the system with a branded asset (instead of a generic asset) to generate a BSO, which is then placed by the developer using smart object placement system 108.

After the placement of smart object 101 into the 3D environment, user interaction or viewability based metrics generated from smart object 101 can be generated via smart object processing system 110. In one embodiment, smart object processing system 110 can be any system that is capable of analyzing information received from smart object 101 and generate metrics related to any user interaction, including tapping, touching, moving, time spent with the smart object, viewing (e.g., from a distance), requesting detailed description, etc., of smart object 101, via user interface 112. The generated metrics can be useful to advertiser and/or publisher associated with the 3D environment.

Figure 2:
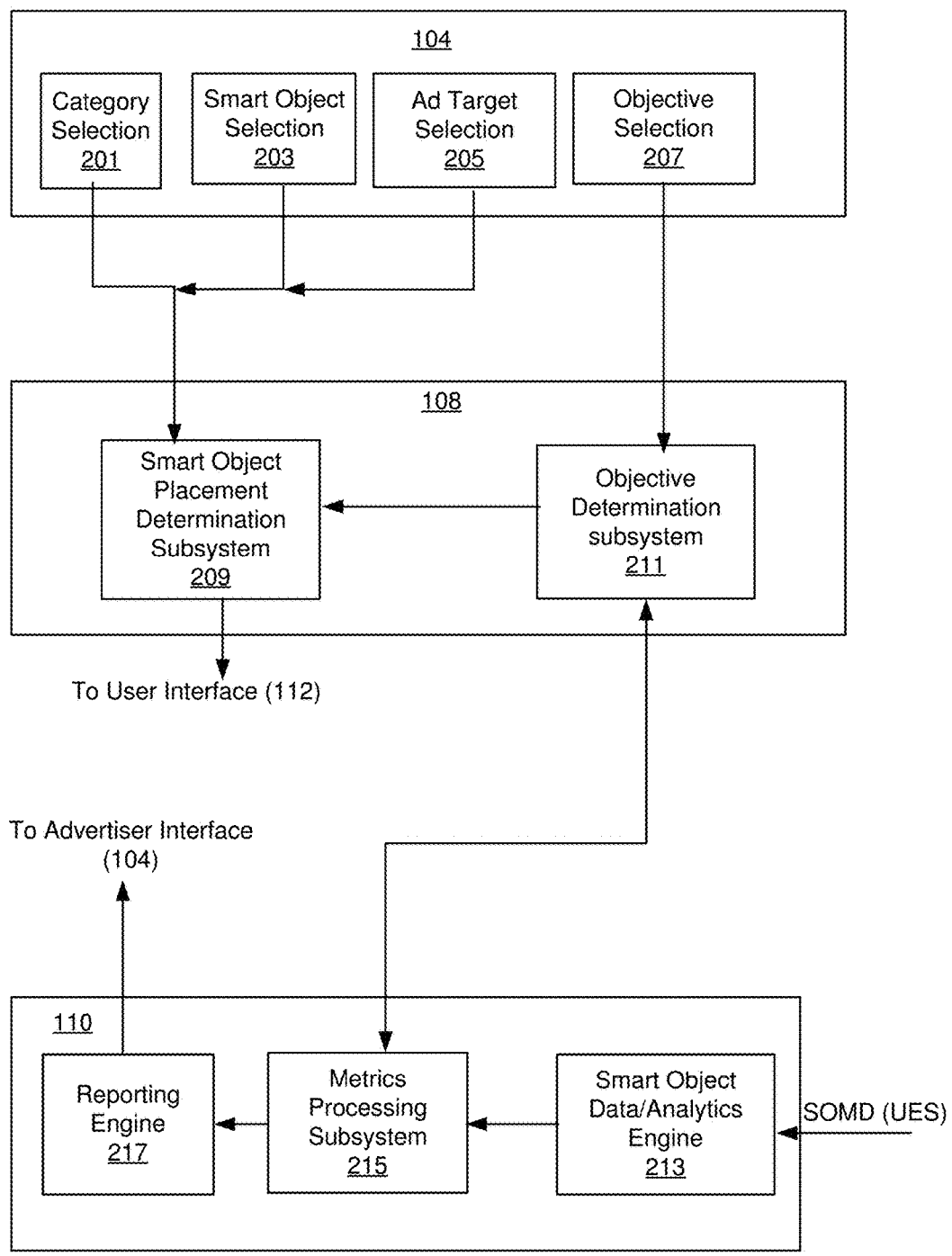
FIG. 2 illustrates a block diagram of the interaction of various subsystems to implement an objective based advertisement placement platform, according to one embodiment of the present invention.

FIG. 2 illustrates a block diagram of the interaction of various subsystems to implement an objective based advertisement placement platform, according to one embodiment of the present invention. As illustrated, advertiser interface 104 can, in one embodiment, be configured to display to an advertiser a category selection module 201 control that can assist the user to select a category (and/or type) of a smart object (out of a plurality of smart objects) that can be displayed to a user in a 3D environment. The advertiser can then be prompted to select smart object 101 using an interface of a smart object selection module 203. Smart object selection module 203 can, in one embodiment, present to the advertiser available smart object(s) 101 associated with the selected category or type using category selection module 201. The advertiser is then presented with an advertisement target selection displayed by module 205 using which the advertiser can assign an intended audience of the selected smart object 101. The intended audience, on one embodiment, can be determined based on age, gender, sexual orientation, browsing/search patterns, purchase history, behavior patterns, psychographic data, etc., of users to determine a suitable target audience that the advertiser may determine to be a potential buyers of the services or goods offered by the advertiser. The advertiser, in one embodiment, can also interact with objective selection module 207 that can assist the advertiser with an objective associated with a smart object that is to be displayed to the user. The objective of an advertiser can include whether a user has completed a desired set of engagement rules (or interacted with desired engagement features), as further described herein.

Each module, as referred herein can reside on one or more computer systems or electronic devices. Therefore, as an example, category selection module 201, smart object selection module 203, advertisement target selection module 205, or objective selection module 207, can each reside on the advertiser's computing system or can reside on a backend computer that can transmit the information transmitted by the module to advertiser interface 104. Further, in another embodiment, category selection module 201, smart object selection module 203, advertisement target selection module 205, or objective selection module 207, can also reside in, or be a part of, smart object placement system 108, while advertising interface 104 receives the transmitted information. In any case, FIG. 2 is for illustrative purposes only and demonstrates the interaction of each subsystem or module with another, but does not necessarily signify the exact location where a particular module resides. A person of ordinary skill in the art would appreciate that many other variations can be performed to FIG. 2 to implement the invention disclosed herein.

In one embodiment, category selection module 201, smart object selection module 203, advertisement target selection module 205 can transmit information to smart object placement determination subsystem 209 of smart object placement system 108. The received information can assist smart object placement determination subsystem 209 to determine the smart object that has to be placed within an online 3D environment. The information from objective selection module 207 can be received by objective determination subsystem 211 of smart object placement system 108 to determine if an advertiser submitted objective has been achieved. Objective determination subsystem 211 can manage the rules (and conditions) provided by each advertiser for each BSO for each 3D online environment and track the implementation of the rules as it relates to each user (that is, a potential customer of the advertiser) to whom the smart object is displayed. In case objective determination subsystem 211 determines that an advertiser provided objective for a BSO in a 3D environment has been achieved, objective determination subsystem 211 can instruct smart object placement determination subsystem 209 to stop displaying the BSO to a user. Objective determination subsystem 211 can track whether an objective (as it relates to a user) has been achieved, in one embodiment, across many platforms from which the user can log in. In one embodiment, once a user has been identified (e.g., by logging in, internet protocol address, one or more media access control address (MAC addresses), etc.), objective determination subsystem 211 can instruct smart object placement determination subsystem 209 to stop displaying a BSO (in one or more 3D online environments) once the advertiser provided objective is met, even if the user logs into another online 3D environment. In another embodiment, objective determination subsystem 211 can determine a period during which the BSO is not displayed to the user (via user interface 112). The period can be preconfigured by the system or can be configured by the advertiser while providing the objective to objective selection module 207.

During user interaction with a 3D environment, a set of smart objects is presented to the user via user interface 112. Each smart object can be a generic smart object associated with non-branded information, or a branded smart object that is associated with information related to a branded product or good. Upon user selection, in one embodiment, the data associated with a smart object can be displayed in a separate window (e.g., tabbed window, sliding window, popup window, etc.) to the user on user interface 112. For illustrative purposes the present invention embodiments of the present invention assume the presence of branded smart objects (that is, smart objects that are associated with brand information) within the 3D environment, however, a person of ordinary skill in the art would appreciate that the teachings described herein can be implemented for non-branded smart objects (that is, smart objects that have other non-branded data associated with it) as well, or a combination thereof. In one embodiment, the user interface 112 machine can transmit Smart Object Metric Data (SOMD) to smart object processing system 110.

Smart object processing system 110 can include, in one embodiment, smart object data analytics engine 213 which can receive and process the SOMD from each user in a 3D environment where a smart object is displayed. In one embodiment, SOMD can include data that can be quantified as a score, value, percentage, numerical data, etc., that can assist the advertiser to derive the importance (or significance) of the smart object to the user. As a non-limiting example, if user proximity and/or viewability of the set of smart objects is selected as the SOMD, then the percentage value of the screen taken by each of the set of smart objects and/or their proximity to the user can signify as a metric quantifier that the user may be interested in learning more about a smart object out of the set of smart objects of a 3D environment. The set of smart objects can include, a number of smart objects within the three dimensional online environment, a number of smart objects displayed on the user interface, a number of smart objects within a scene of the three dimensional environment, or a number of smart objects that have been rendered within the three dimensional environment.

For a set of smart objects, a smart object manager of user interface 112 transmits smart object related data, including smart object identification data (SOID) (e.g., smart object ID number) and related SOMD of each smart object, to smart object data engine 213 of smart object processing system 110. In one embodiment, the smart object manager can transmit smart object related data of each smart object at periodic intervals. In another embodiment, smart object manager transmits the smart object related data of each smart object upon user request to display BRDI associated with one or more smart object. In yet another embodiment, smart object manager can transmit smart object related data of each smart object in real-time, that is, as soon as the data is received from the smart object(s). In one embodiment, upon receiving smart object related data, smart object data engine 213 can process SOMD of each smart object identified by its respective SOID to determine its respective significance to the user. In one embodiment, SOMD transmits the user's interaction/action related to a smart object based on user engagement data (in one embodiment, transmitted by a smart object manager residing within the 3D environment). Yet, in another embodiment, SOMD can be transmitted partially by smart object manager (e.g., viewability and related time data, that is, how long the smart object was viewed for, by the user). In this embodiment, user engagement data related SOMD is transmitted from within a tab/window (directly to the system) where the user engages with engagement features, as described herein. Engagement data, in one embodiment, can include a discount coupon, a social media/networking web link, an email based link (that is, a link to directly share with another person over email), a web link to visit a web page associated with the branded information, or a web link to purchase the product/good or service associated with the smart object or generally any form of digital communication to share (or engage) the information with another party, as appreciated by a person of ordinary skill in the art.

SOMD, in one embodiment, can include a User Engagement Score (UES). In one embodiment, the UES can be an advance Key Performance Indicator (KPI). A UES can be alpha-numeric string that represents user interaction with a smart object (in one embodiment, collected from various sources as further described herein), providing data related to a characteristic or feature of interaction of a user with the smart object and the number of times the characteristic or feature occurred, along with the time taken to complete the interaction. For example, in one embodiment, the UES can be represented as:

$eUx.vy.ts.in.pm$ where e represents a user engagement identifier related to the smart object, U represents a value for the number of engagement features displayed to the user, x represents a number of engagement features that were utilized by the user, v represents a viewability identifier related to the smart object, y represents a size of the BSO with respect to at least one display of the user interface, t represents a time identifier related to the smart object, s represents a number of seconds the user interacted with, or viewed, the BSO, i represents a user intent identifier related to the smart object, n is a variable representing whether the intent was fulfilled, p represents a purchase identifier related to the smart object, and m is a variable representing whether the user purchased the service or product represented by the BSO, and wherein the period symbol (.) represents a separator identifier (delimiter) between the various data transmitted within the UES related to the smart object. Table 1 defines the features of a UES string, according to one embodiment of the present invention.

TABLE 1

| Identifier | Feature/Characteristic | Definition |
| --- | --- | --- |
| e | engagement | Number of click actions (e.g., where to buy, visit online store, download coupon, Social Network 'Like', 'Share' 'Save', etc. |
| v | viewability (In 3D environment) | Numerical Percentage of the entire Smart Object's size in relationship to the user's screen size. |
| t | time seen (In 3D environment) | Total time the Smart Object was viewed by the user on the screen in the 3D environment game |
| st | time seen (In 3D environment) | Total time the Smart Object was viewed by the user in a Tab or (pop up) window displaying details of the Smart Object. |
| at | time seen (In Ad platform's application) | Total time the Smart Object was seen on an Ad platform application (can be different from the 3D environment) |
| i | purchase intent | User downloaded material related to the Smart Object (e.g., Coupon) |
| P | purchase | Use purchased the goods of services represented by the Smart Object |

In one embodiment, engagement identifier e can followed by two variables U and x that identify the number of engagement features (associated with a smart object) displayed by an advertiser and the number of engagement features upon which there was user action (e.g., click on an engagement feature), respectively. Table 2 provides examples of reporting the number of displayed engagement features and any action taken by the user, according to one embodiment.

TABLE 2

| Engagement examples | Meaning |
| --- | --- |
| eN | No engagements were added to the campaign. Not available. |
| eA0 | One engagement was selected by the brand but no action was taken by the user |
| eA1 | One engagement was selected by the brand and one action was taken by the user |
| eB1 | Two engagements was selected by the brand and only one action was taken by the user |
| eB2 | Two engagements was selected by the brand two actions was taken by the user |
| eD4 | Four engagements was selected by the brand and four actions was taken by the user |

Note, in the example above the alphabetical letters represent how many engagement actions a brand selected for their advertisement campaign (e.g., A=1, B=2, C=3, etc.), however a person of ordinary skill in the art would appreciate that any identifier (numerical or non-numerical) can be used to represent the number of engagement features selected by the advertiser or to represent the number of actions taken by the user.

In one embodiment, viewability identifier v can followed by a variable y that represents the percentage size (relative to the user's viewport/screen) of the smart object. Table 3 provides examples of reporting the viewability of a smart object with respect to a user's viewport/screen, according to one embodiment of the present invention.

TABLE 3

| viewability identifier examples | Meaning |
| --- | --- |
| v000 | The Smart Object was not seen |
| v005 | The Smart Object was 5% of the user's screen size |
| v025 | The Smart Object was 25% of the user's screen size |
| v060 | The Smart Object was 60% of the user's screen size |

In one embodiment, total time seen identifier t can followed by a variable s that represents the total time the smart object was viewed/seen by the user. Table 4 provides examples of reporting the total time seen of a smart object (by a user), according to one embodiment of the present invention.

TABLE 4

| Time seen identifier examples | Meaning |
| --- | --- |
| t000 | The Smart Object was not seen |
| t005 | The Smart Object was seen for 5 seconds |
| t025 | The Smart Object was seen for 25 seconds |
| t060 | The Smart Object was seen for 60 seconds |

In one embodiment, smart object manager transmits SOMD including viewability data (v) and its related time data (t) continuously to smart object data engine 213 when the smart object is within the user's screen/viewport. In another embodiment, the smart object manager stops transmitting SOMD including viewability data (v) and its related time data (t) when the smart object is not visible on the user's screen or viewport. In another embodiment, smart object manager also stops transmitting viewability data (v) and its related time data (t) when it is determined that the user is interacting with the data related to a smart object in another window, tab, or popup.

In one embodiment purchase intent identifier i can followed by a variable n that represents whether the user has taken an action that could represent an intent to purchase the service or goods (e.g., download coupon, etc.) represented by the smart object. Table 5 provides examples of reporting the user's purchase intent, according to one embodiment of the present invention.

TABLE 5

| Purchase intent examples | Meaning |
| --- | --- |
| iN | Not available |
| i0 | User did not downloaded Coupon |
| i1 | User did downloaded Coupon |

In one embodiment purchase identifier p can followed by a variable m that represents whether the user has taken an action that could represent that the user has purchased the service or goods represented by the smart object. Table 6 provides examples of reporting the user's purchase related to a smart object, according to one embodiment of the present invention.

TABLE 6

| Purchase identifier examples | Meaning |
| --- | --- |
| pN | Not available |
| p0 | User did not use coupon |
| p1 | User used coupon |

In one embodiment, SOMD received by smart object data engine 213 can include UES (partial or complete) that is processed according to the examples illustrated in tables 1-6. In one embodiment, partial or complete UES related to a smart object can be received from multiple platforms/subsystems. In other words, a UES related to a smart object can be derived from multiple 3D environments (including multiple games, augmented reality platforms, virtual reality platforms, etc.) for a user. In one embodiment, the UES can be transmitted from different subsystems to smart object data engine 213. Thus, in one embodiment, viewability (v) and total time (t) related to the viewability can be transmitted from a smart object manager, and engagement (e) and associated time (st) related data can be transmitted by a window or tab displaying the associated information. In one embodiment, the user, from within the 3D environment, is given the opportunity to save smart object related information to a front end software application (e.g., mobile, web based, etc.), of the advertising platform's system (e.g., system of FIG. 1) for future engagement with the smart object's related information. In this embodiment, if the user engages with the smart object data within the advertising platforms' software system, engagement related data (e) and the time a user spends interacting with the smart object's associated information (at) can be transmitted from the advertising platform's software application.

In one embodiment, smart object data engine 213 transmits the information (received from various sources) to metrics processing system where the UES received from various sources is concatenated to generate a unified (complete) UES. Therefore, the partial UES from various sources can then be transmitted to metric processing subsystem 215, where it is concatenated together to process the metrics related to the feature/characteristics of a smart object when interacted (or acted upon) by the user. The information processed by metric processing subsystem 215 can then be used to generate reports by reporting engine 217 related to the smart object's performance. In one embodiment reporting engine 217 can calculate and transmit the smart object's performance related data to the advertiser (via interface 104).

In one embodiment smart object data engine 213 can process the received (partial or complete) UES and transmit the information as illustrated in table 7. As illustrated by various examples in table 7, a UES string received by smart object data engine 213, can be processed to determine engagement, viewability, time, intent, and purchase related to a smart object. As can be seen in table 7, not all identifiers need to be presented to the smart object data engine 213 or metric processing subsystem 215 to generate a complete UES. In one embodiment, the identifiers not presented within the UES (e.g., 'at' and 'st' of table 1), are ignored by metric processing subsystem 215, and can be assigned a null (or default) value (if not provided within the UES).

TABLE 7

UES Processing Examples by smart object data engine 213

| UES | engagement | viewability | time | intent | purchase |
| --- | --- | --- | --- | --- | --- |
| eD4.v005.t023. i1.p1 | e: advertiser selected to use four (D) engagement features. User clicked on all (4). | v: The Smart Object was 5% of the user's screen size | t: The Smart Object was seen for 23 seconds | i: Coupon was downloaded | p: User used coupon |
| eA1.v033.t053. i1.p0 | e: advertiser selected to use one (A) engagement features. User clicked on all (1). | v: The Smart Object was 33% of the user's screen size | t: The Smart Object was seen for 53 seconds | i: Coupon was downloaded | p: User did not use coupon |
| eB0.v033.t020. i0.p0 | e: advertiser selected to use two (2) engagement features. User did not clicked on any of them. | v: The Smart Object was 033% user's screen size | t: The Smart Object was seen for 20 of the seconds | i: Coupon was offered but NOT downloaded | p: User did not used coupon |

TABLE 7-continued

UES Processing Examples by smart object data engine 213

| UES | engagement | viewability | time | intent | purchase |
| --- | --- | --- | --- | --- | --- |
| eN.v075.t020.iN.pN | e: advertiser did not use any engagement features (N). | v: The Smart Object was 75% of the user's screen size | t: The Smart Object was seen for 20 seconds | i: Coupon was not offered to the user (N) | p: User did not purchase |

In one embodiment, based on the UES processed by metric processing subsystem 215, objective determination subsystem 211 determines whether an advertiser objective has been met (by the user). Advertiser objective, in one embodiment, can include, whether a user has shared information about the smart object on social media, whether the user has purchased (or shown an intent to purchase) the service/goods associated with the smart object, etc. Generally, advertiser objective can be any information based on which the advertiser can decide whether to continue showing the BSO to a user, to display another BSO to the user, or to not display a BSO to a user at all.

In one embodiment, an advertiser can associate engagement rules with a BSO to determine if an objective has been completed (or met) by a user. In one embodiment, engagement rules can utilize Boolean 'and' and Boolean 'or' operators. For example, the advertiser can set an engagement rule of '[[e1 and (i1 or p1)]]' as a threshold condition for a BSO to not reappear to a user in a 3D environment with an objective to determine brand awareness to the user associated with a BSO. Objective determination subsystem 211 can process this rule to determine that if at least an engagement feature was clicked by the user or an intent to purchase or purchase actions of the goods or services associated with the BSO occurred, then determine that the objective has been met, and not to display the BSO to the user again for a predetermined period of time. Therefore, based on this rule, if metric processing subsystem 215 determines a UES of eB1.v005.t005.i0.p0 then the system determines the objective has been met. However, if the UES is determined to be 'eB0.v045.t050.i0.p0' then the objective determination system can determine that the objective has not been met, and the BSO is displayed to the user until the objective has been completed.

If it is determined that the advertiser objective has been completed, objective determination subsystem 211 transmits an instruction to smart object placement determination subsystem 209 to stop displaying the BSO to the user (via user interface 112). In one embodiment, objective determination subsystem 211 can instruct smart object placement determination subsystem 209 to stop displaying the BSO to the user for a predetermined time (as set by the advertiser while determining an objective selection 207). In another embodiment, objective determination subsystem 211 can instruct smart object placement determination subsystem 209 to display an alternative BSO to the user once the advertiser objective has been completed by the user.

Figure 3:
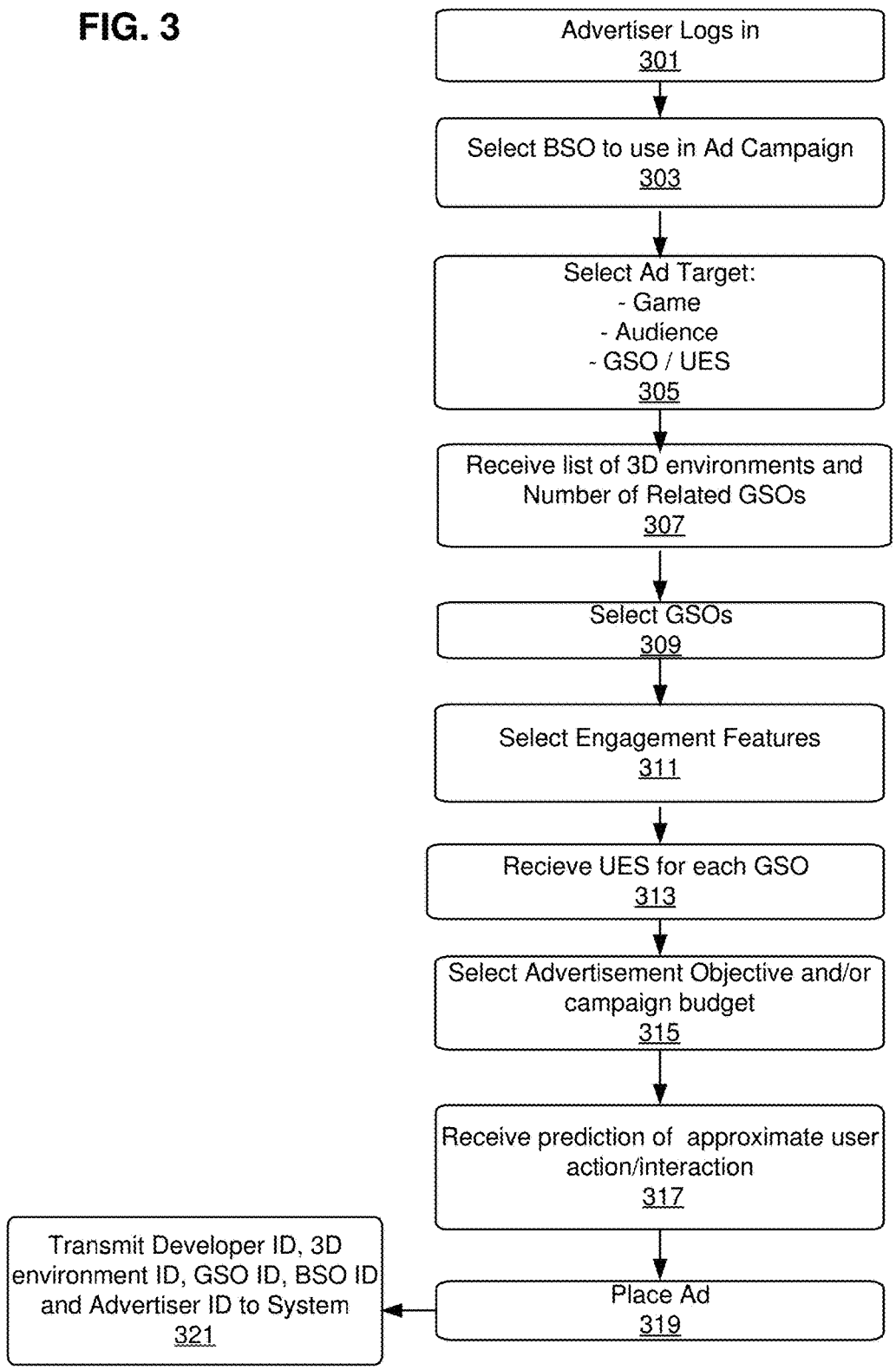
FIG. 3 illustrates a diagram describing the operations that can be performed by an advertiser according to one embodiment of the present invention.

FIG. 3 illustrates a diagram describing the operations that can be performed by an advertiser according to one embodiment of the present invention. As illustrated at 301 the advertiser logs in. At 303, the advertiser can select a BSO that is to be used in an advertisement campaign. A BSO is a branded smart object that can replace a generic smart object placed in a 3D environment. At 305 the advertiser selects an intended advertisement target. The advertisement target, in one embodiment, can be a particular 3D environment (e.g., game, virtual environments, virtual real estate tour, etc.), a target audience (e.g., based on age, race, sexual orientation, geographical location, behavioral patterns, or a combination thereof), a specific GSO, or UES. At 307, the advertiser receives list of 3D environments and related GSOs to the 3D environment. At 309, the advertiser selects GSOs to be used in the 3D environment. At 311, after selecting a GSO the advertiser can select engagement features that are to be displayed to the user (when the user seeks more information about a smart object). Based on the selected engagement features, in one embodiment, the advertiser can receive UES for the selected GSO. In one embodiment, the UES is transmitted by metric processing subsystem 215 or reporting engine 217, depending on the implementation. At 315, the advertiser is prompted to select an advertisement objective and/or campaign budget associated with the advertisement objective. At 317, the advertiser receives a prediction of approximate user interaction (or action) that is computed by the smart object processing system 110 based on the engagement features and advertisement objective selected by the advertiser. At 319, the advertiser reviews the information and can submit an instruction to place the advertisement with the smart object. At 321, the advertiser's interface 114 transmits developer identification data, 3D environment identification data, the identification data related to the selected GSO and/or BSO and advertiser identification data to smart object processing system 110.

Figure 4:
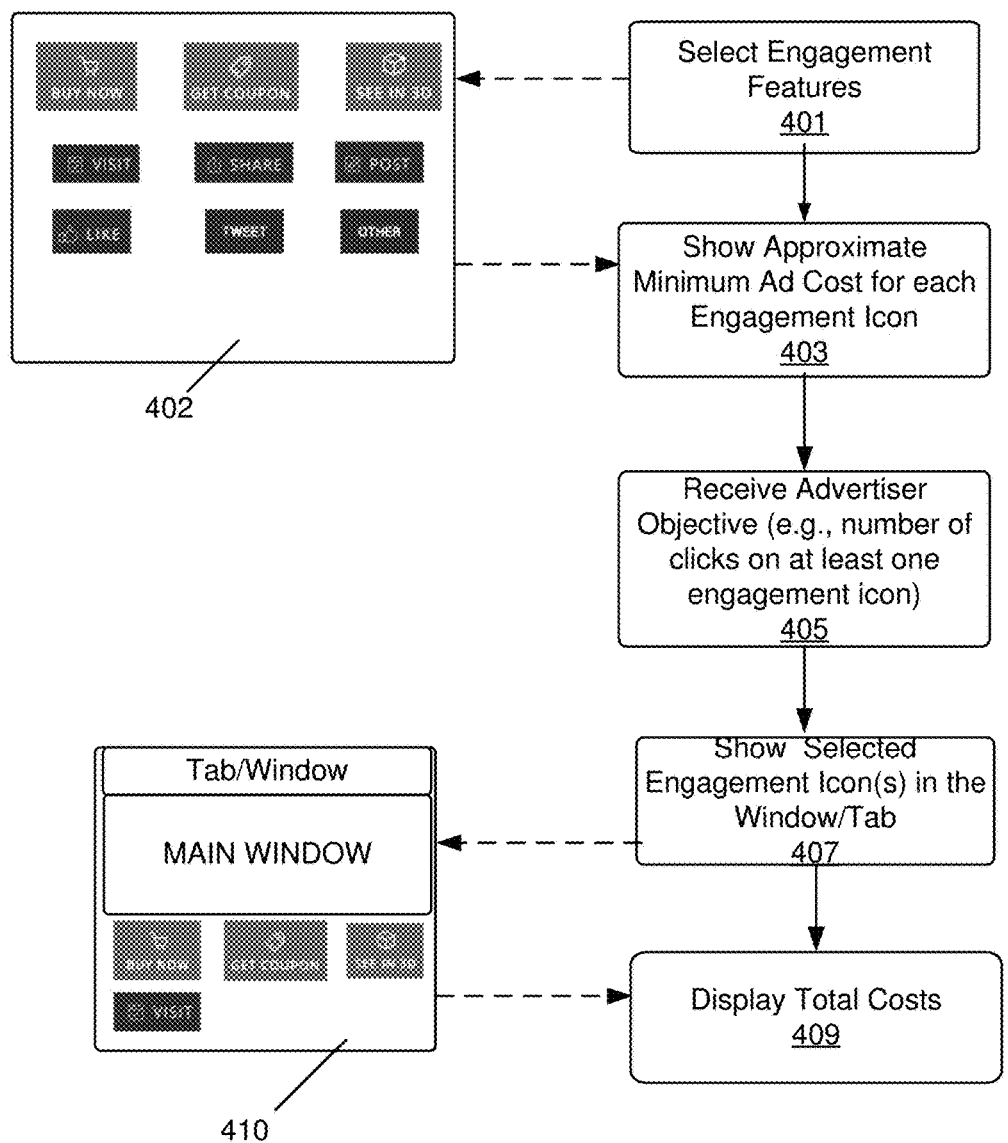
FIG. 4 illustrates a diagram describing selection of engagement features by an advertiser to display to a user, according to one embodiment of the present invention.

FIG. 4 illustrates a diagram describing selection of engagement features by an advertiser to display to a user, according to one embodiment of the present invention. At 401, the advertiser if offered a selection of engagement features that can be selected to be displayed to the user (upon user interaction with the smart object). As illustrated at 402, the engagement features, without limitation, can include a buy now link, a coupon link, visit product website, view a detailed view of the smart object in 3D, share information related to the smart object branding, post, like, tweet, or any other form of interaction/communication between the user and the smart object. At 403, the minimum advertisement cost for each selected engagement icon is displayed to the advertiser. At 405, the system receives the advertiser objective. At 407, the advertiser selected engagement icons are displayed, in one embodiment. As illustrated, at 410, the advertiser selected engagement icons (e.g., buy now, get coupon, see in 3D, visit website), can be previewed to the advertiser. In one embodiment, these features the selected engagement icons are displayed to the user, upon selection (or request) of more information related to the smart object. At 409, the total cost related to the advertisement campaign (based on the selected features and advertisement objective) is displayed to the advertiser.

Figure 5:
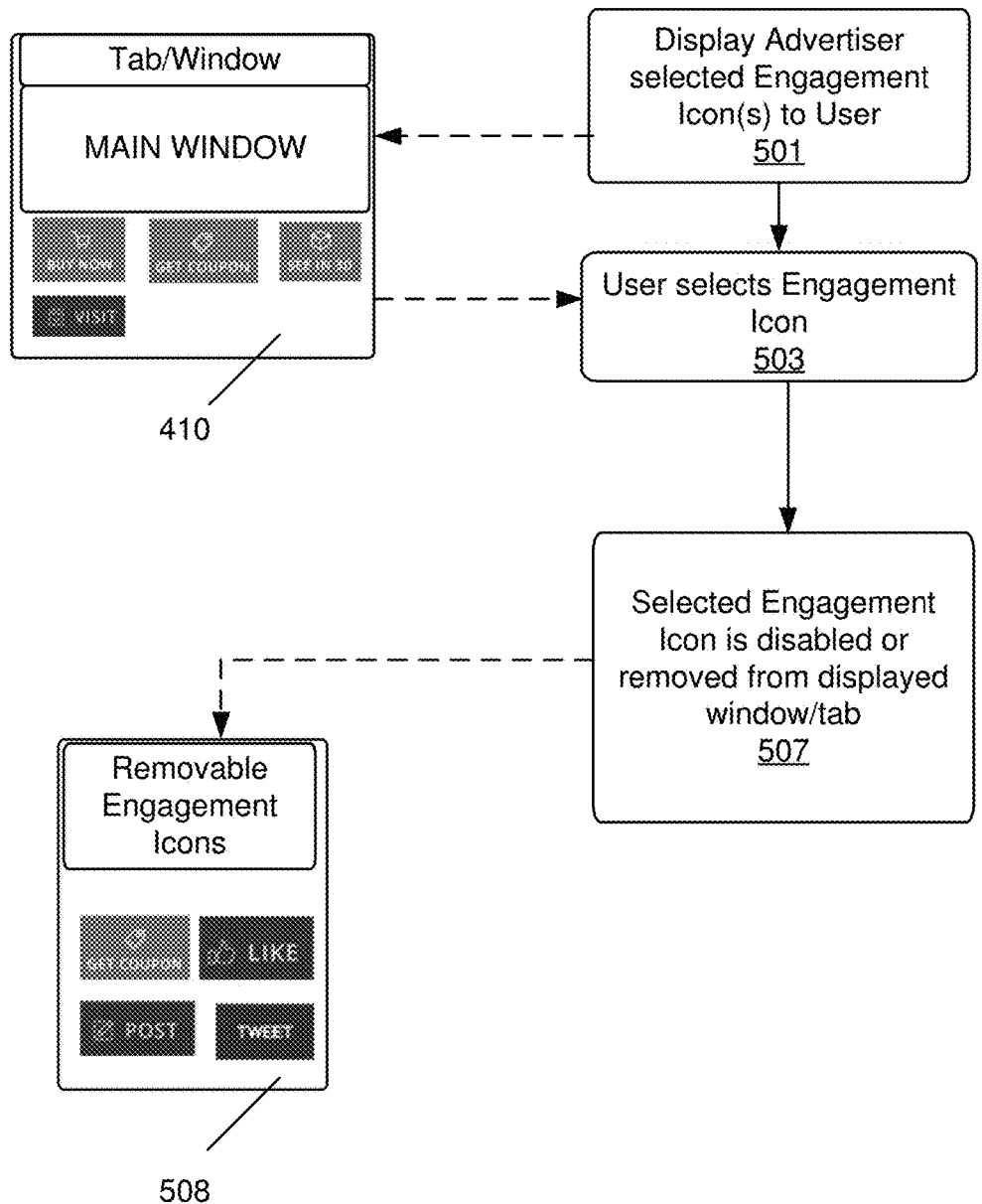
FIG. 5 illustrates a diagram describing selection of engagement features by a user, according to one embodiment of the present invention.

FIG. 5 illustrates a diagram describing selection of engagement features by a user, according to one embodiment of the present invention. In one embodiment, the user, within a 3D environment, is presented with advertiser related branded smart objects. After a user interacts with the smart object in a 3D environment (e.g., clicks or tap on the smart object or requests more information by clicking on a button related to presenting details about the smart object), at 501, the advertiser selected engagement features can be displayed to the user. For example, as illustrated, features selected by the advertiser at 410, can, in one embodiment, be displayed to the user. At 503, the user engages with the data provided (e.g., social network share, purchase, download coupon, etc.), and associated UES is transmitted the smart object engine 213. In one embodiment, at 507, the engagement icon selected by the user is disabled or removed from the displayed window. In one embodiment, the advertiser is given the option to select the icons that can be disabled, as shown at 508. In another embodiment, the engagement icons can be disabled or removed based on the objectives of the advertiser. It should be noted, an advertiser can have multiple objectives associated with an advertisement campaign. Thus, once a UES (partial or complete) is received by metrics processing system, the UES received thus far can be retrieved by the objective determination subsystem 211 and engagement icons can be removed (if a corresponding engagement rule is provided by the advertiser).

Figure 6:
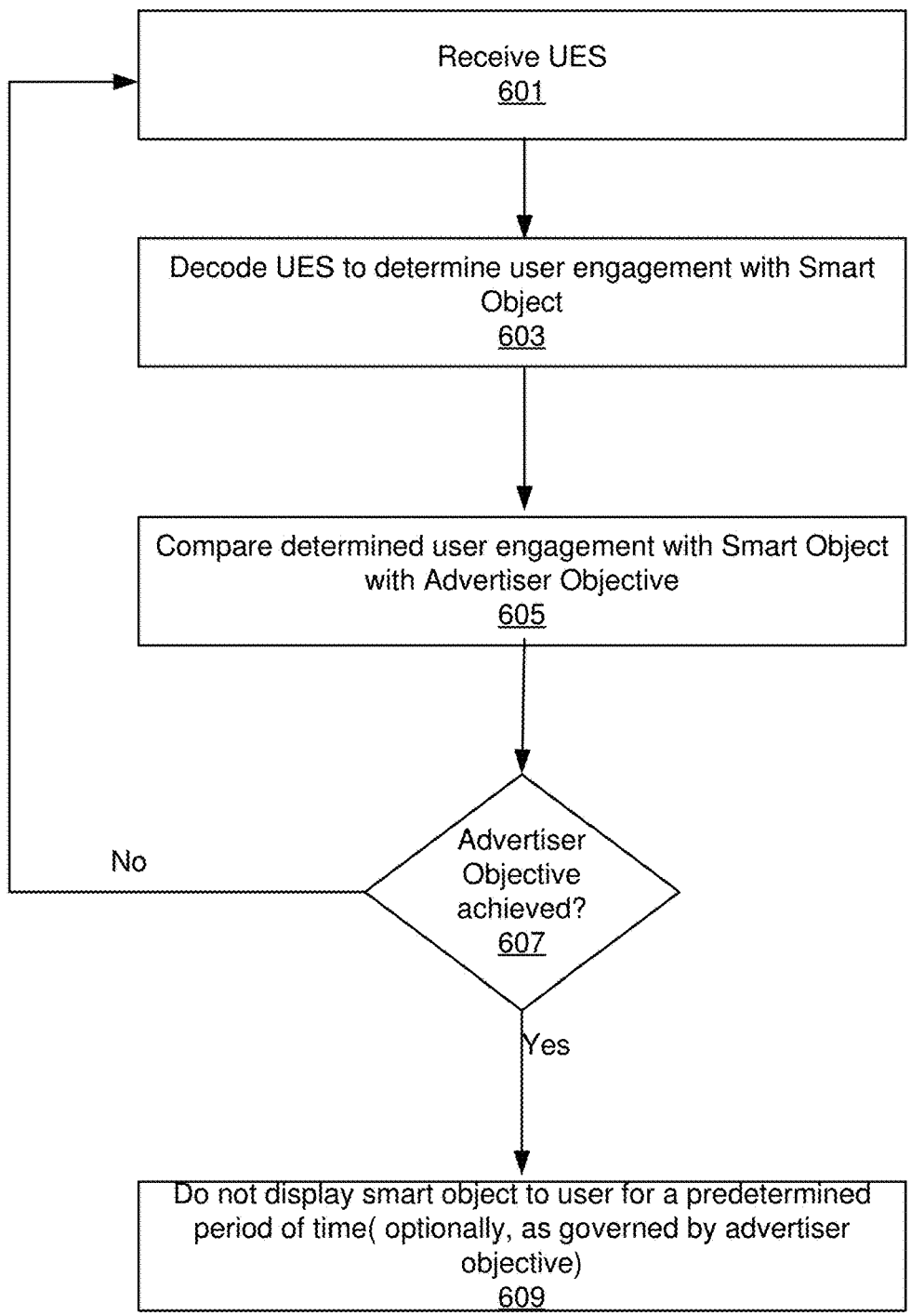
FIG. 6 illustrates a flowchart describing the operations of determining whether an objective of an advertiser has been met based on the UES, according to one embodiment of the present invention.

FIG. 6 illustrates a flowchart describing the operations of determining whether an objective of an advertiser has been met based on the UES, according to one embodiment of the present invention. At 601, the objective determination subsystem 211 received UES from the metrics processing subsystem 215. At 603, the objective determination subsystem 211 decodes the UES string to determine user engagement with the BSO. At 650, objective determination subsystem 211 compares the user engagement of the BSO with the engagement rule of the advertiser, and 607, objective determination subsystem 211 determines whether the objective has been achieved. In one embodiment, this can be performed based on the determination of the comparison of the engagement rule with the UES. If, at 607, it is determined that the objective has not been achieved, control flows back to 601 and the objective determination subsystem 211 continues to receive UES from metrics processing subsystem 215. However, if, at 607, it is determined that the objective has been achieved objective determination subsystem 211 instructs smart object placement determination subsystem 209 to not display the BSO to the user, as illustrated at 609. In one embodiment, objective determination subsystem 211 provides an instruction not to display the BSO for a predetermined period of time. In an optional embodiment, the advertiser can choose the predetermined period of time during which the BSO is not displayed to the user. Yet, in another embodiment, the advertiser provides the predetermined period of time during which the BSO is not displayed to the user within the engagement rule.

Figure 7:
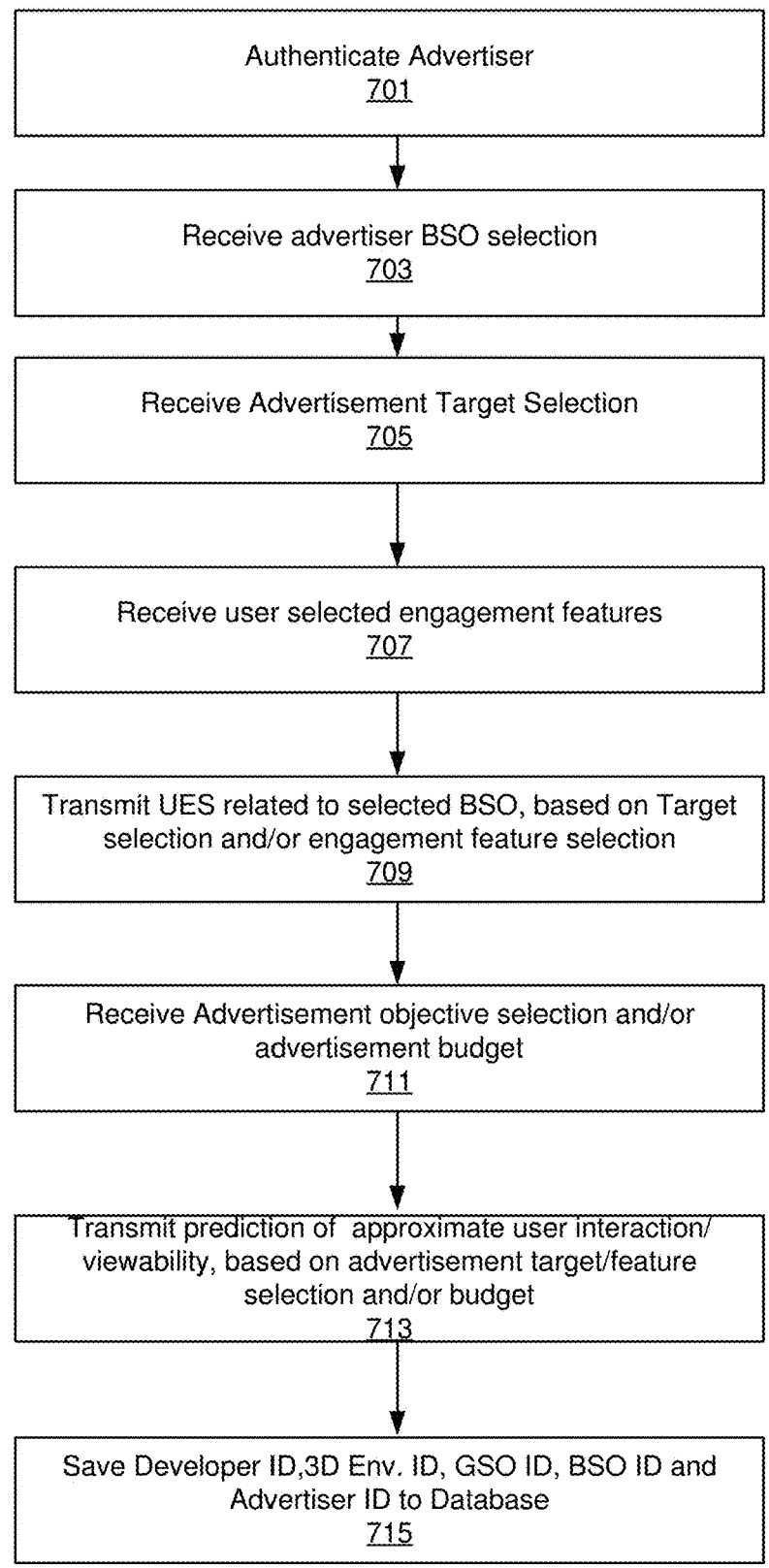
FIG. 7 illustrates a flow chart describing the operations that can be performed by a server while the advertiser selects a smart object for engagement with a user, according to one embodiment of the present invention.

FIG. 7 illustrates a flow chart describing the operations that can be performed by a server while the advertiser selects a smart object for engagement with a user, according to one embodiment of the present invention. At 701, the advertiser is authenticated. At 703, the system receives BSO selection from the advertiser. At 705, the system receives advertisement target selection from the advertiser. At 707, the system receives engagement selection features from the advertiser. At 709, the system transmits UES related to the selected BSO to the advertiser, based on the target selection and/or engagement feature selection. At 711, the system receives an objective selection and/or advertisement budget from the advertiser. At 713, based on the received information the system predicts (and transmits the prediction) of approximate user interaction/viewability, based on advertisement target/feature selection and/or budget. At 715, the system saves the developer identification data, 3D environment identification data, GSO identification data, BSO (or asset) identification data and advertiser identification data to database 121.

Figure 8:
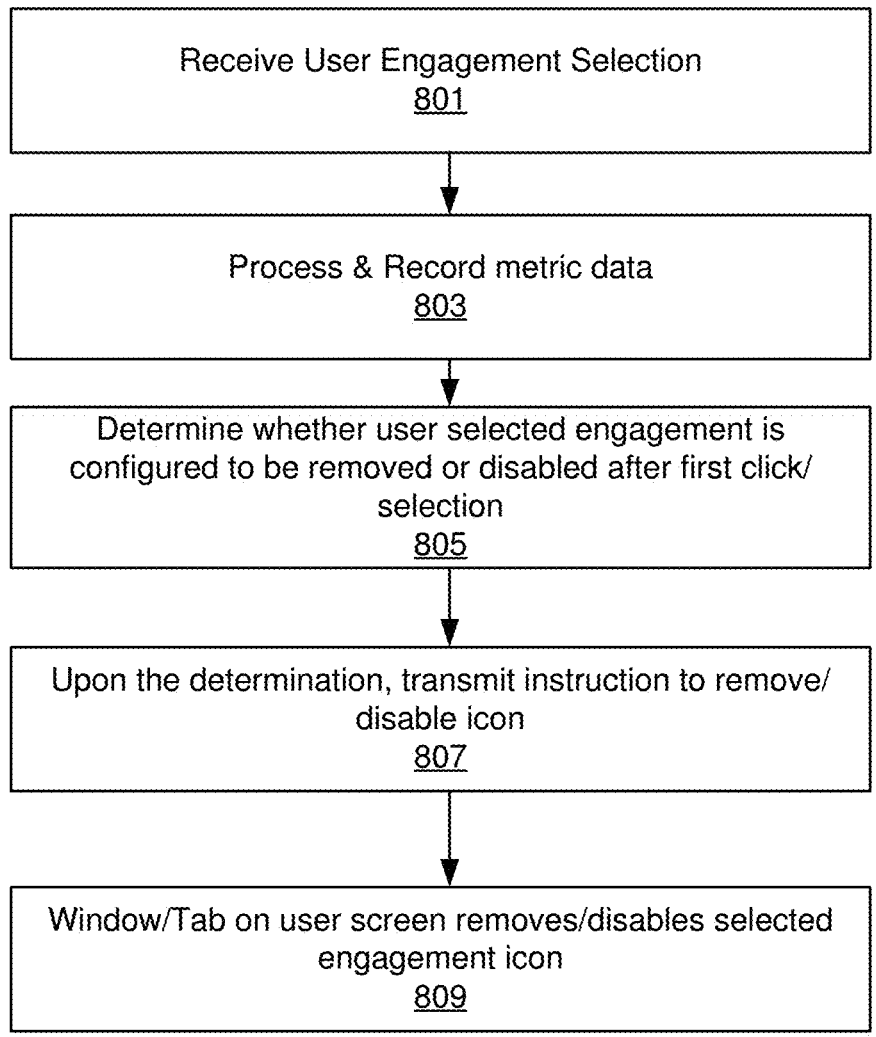
FIG. 8 illustrates a flow chart describing the operations that can be performed by a server upon receiving information from a user, according to one embodiment of the present invention.

FIG. 8 illustrates a flow chart describing the operations that can be performed by a server upon receiving information from a user, according to one embodiment of the present invention. In one embodiment, the system receives the user engagement selection from user interface 112, at 801. The user engagement selection, can be viewability data (v) time data (t) from smart object manager, or engagement feature information performed by the user (e.g., social network share, email, show intent to purchase, or purchase product associated with smart object). At 803, system records processes and records metric data. At 805, the system determines whether the user selected engagement feature is configured to be removed or disabled after first click/tap or selection. Upon such determination, the system transmits an instruction to remove or disable the selected icon from user interface 112, at 807. At 809, the window or tab on user interface 112 is removed or disabled, upon the determination at 807.

Figure 9A:
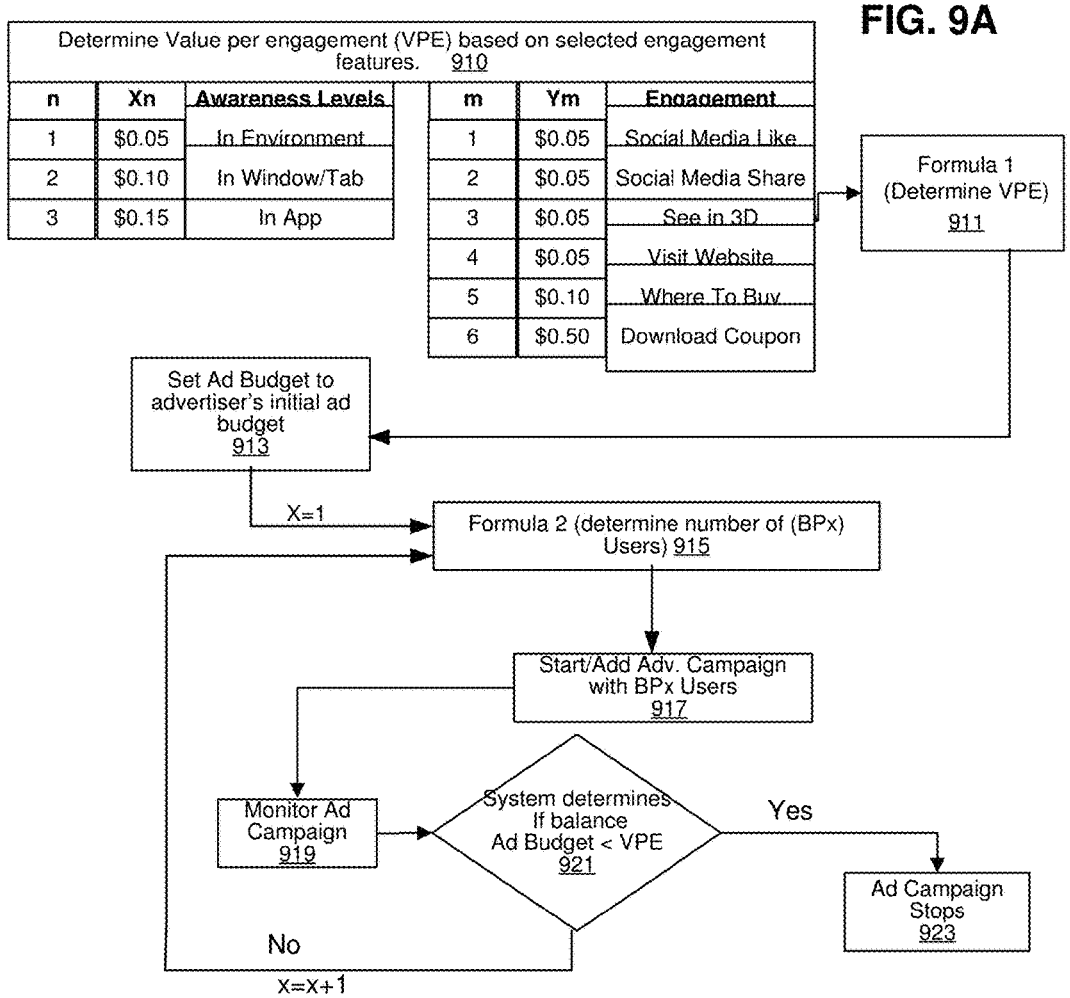
FIG. 9A illustrates a flow chart of predicting the approximate user interaction/viewability that can be reached in an advertisement campaign based on the advertiser's budget and viewability and selected engagement features of a smart object, according to one embodiment of the present invention.

FIG. 9A illustrates a flow chart of predicting the approximate user interaction/viewability that can be reached in an advertisement campaign based on the advertiser's budget and viewability and selected engagement features of a smart object, according to one embodiment of the present invention. After the system receives an advertiser's selected engagement features and advertisement budget (e.g., as illustrated by reference numeral 711 of FIG. 7), the system can calculate the value per engagement (VPE) of the advertiser selected features based on the predetermined amount for each feature. The currency amount referenced at numeral 910 of FIG. 9 are exemplary only; a person of ordinary skill in the art would appreciate that the amounts referenced at 910, in one embodiment, are dependent on the type of 3D environment and, in another embodiment, can be changed in real time. $X_n$ is a variable value determined by the awareness level of where the user engages with the smart object or its associated data. For example, the awareness level can be within the 3D environment, within a window or tab, or within a software application provided by the advertisement platform (e.g., smart object data saved for later viewing by a user), etc. $Y_{in}$ is a variable value determined based on engagement features utilized by the user. For example, engagement features can include, social media likes, shares, viewing the smart object in 3D, visiting a website associated with a smart object, see a location where to buy the product, download a coupon, etc.

Thereafter, at 911, a maximum value per engagement (VPE) can be computed using formula 1 illustrated at FIG. 9B. The VPE provides the total advertisement budget that can be consumed by a user, in a 3D environment. At 913 the advertisement budget is set to the advertiser's initial campaign budget. To determine an initial number of users for brand placement (that is placement of the BSO in the selected 3D environment), an iteration variable (herein referred to as x) is initiated and set to 1 (for the first iteration). At 915, the number of initial user for brand placement is determined using formula 2 to determine the number of users $BP_x$, as illustrated at FIG. 9C, where x signifies the number of iterations of brand placement user determination. At 917, the advertisement campaign is started with BPx users. At 919, the advertisement campaign is monitored to determine the consumed advertisement budget (based on actual user engagement/viewability with the smart object). At 921, if the system determines that the advertisement budget is below the VPE, and if so control passes to 923 where the advertisement campaign is stopped. However, if the system determines that the advertisement budget is more than or equal to the VPE, the brand placement iteration variable is incremented and BPx is recalculated with the balance budget by passing control to 915, as described above.

As a non-limiting example, a $30,000 advertisement budget with a total value per engagement (VPE) of $3 per user can initially reach 10,000 unique users. At the conclusion of each 3D environment (e.g., game) advertisement monitoring subsystem, at 919, credits the values of engagement metrics not reached back into the Advertiser's Campaign Repository (ACR). When enough funds are accumulated, the advertisement placement will be sent to a new user. This cycle continues until all advertising funds have been exhausted.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

Figure 10:
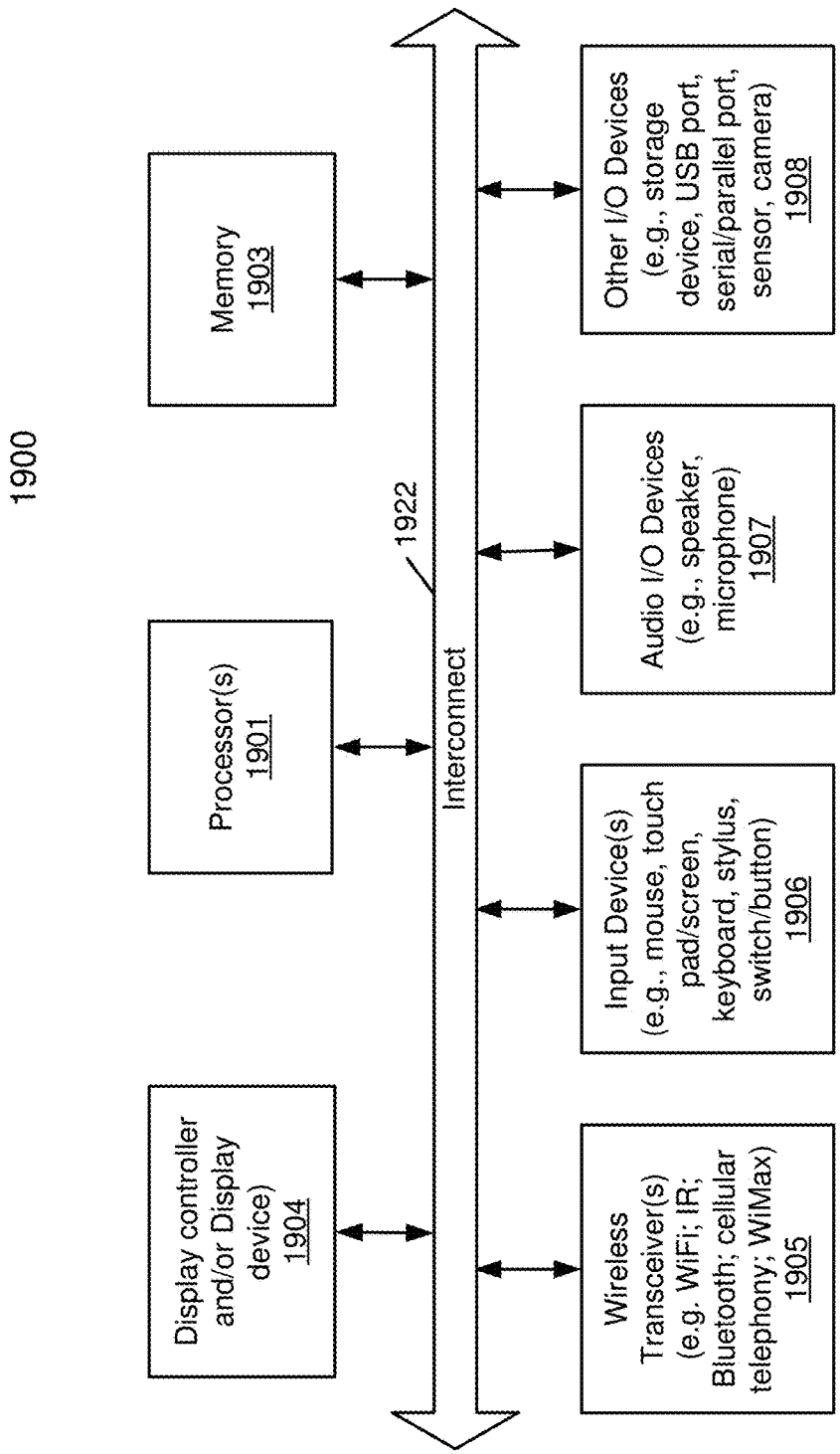
FIG. 10 illustrates a block diagram illustrating a data processing system such as a computing system which may be used with one embodiment of the invention.

FIG. 10 is a block diagram illustrating a data processing system such as a computing system 1900 which may be used with one embodiment of the invention. For example, system 1900 may be implemented as part of an objective based advertisement placement platform. In one embodiment, system 1900 may represent any of the systems or subsystems, as described herein, in FIGS. 1 and 2. System 1900 may have a distributed architecture having dispersed units coupled through a network, or all of its components may be integrated into a single unit. Computing system 1900 may be implemented as part of a diverse range of products implemented by Trivver, Inc.

For example, computing system 1900 may represents any of data processing systems described above performing any of the processes or methods described above. System 1900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1900 is intended to show a high level view of many components of the computer system. However, it is to be understood that additional or fewer components may be present in certain implementations and furthermore, different arrangement of the components shown may occur in other implementations. System 1900 may represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1900 includes processor 1901, memory 1903, and devices 1905-1908 via a bus or an interconnect 1922. Processor 1901 may represent a single processor or multiple processors with a single processor core or multiple processor cores included therein. Processor 1901 may represent one or more general-purpose processors such as a microprocessor, a central processing unit (CPU), or the like. More particularly, processor 1901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1901, which may be a low power multi-core processor socket such as an ultra low voltage processor, may act as a main processing unit and central hub for communication with the various components of the system. Such processor can be implemented as a system on chip (SoC). In one embodiment, processor 1901 may be an Intel® Architecture Core™-based processor such as an i3, i5, i19 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 1901 is configured to execute instructions for performing the operations and methods discussed herein. System 1900 further includes a graphics interface that communicates with graphics subsystem 1904, which may include a display controller and/or a display device.

Processor 1901 may communicate with memory 1903, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 207-2E (published April 2007), or a next generation LPDDR standard to be referred to as LPDDR3 that will offer extensions to LPDDR2 to increase bandwidth. As examples, 2/4/8 gigabytes (GB) of system memory may be present and can be coupled to processor 1901 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1903 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1903 may store information including sequences of executable program instructions that are executed by processor 1901, or any other device. For example, executable code and/or data of a variety of operating systems, device drivers, firmware (e.g., input output basic system or BIOS), and/or applications can be loaded in memory 1903 and executed by processor 1901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1900 may further include IO devices such as devices 1905-1908, including wireless transceiver(s) 1905, input device(s) 1906, audio IO device(s) 19019, and other IO devices 1908. Wireless transceiver 1905 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 1906 may include a mouse, a touch pad, a touch sensitive screen (which may be integrated with display device 1904), a pointer device such as a stylus, and/or a keyboard (e.g., physical keyboard or a virtual keyboard displayed as part of a touch sensitive screen). For example, input device 1906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 1907 may include a speaker and/or a microphone to facilitate voice-enabled functions, such as voice recognition, voice replication, digital recording, and/or telephony functions. Other optional devices 1908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1907 via a sensor hub (not shown), while other devices such as a keyboard or thermal sensor may be controlled by an embedded controller (not shown), dependent upon the specific configuration or design of system 1900.

To provide for persistent storage of information such as data, applications, one or more operating systems and so forth, a mass storage (not shown) may also couple to processor 1901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1901, e.g., via a serial peripheral interface (SPI). This flash device may provide for non-volatile storage of system software, including a basic input/output software (BIOS) as well as other firmware of the system.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, systems, and computer readable medium to implement an objective based advertisement placement platform are described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method to display advertisements in three dimensional (3D) online environment based on an objective of an advertiser, comprising:
   receiving, by a computing device, the objective of the advertiser, wherein the objective determines when to stop displaying a branded 3D digital asset to a user in the 3D online environment, the objective including an engagement rule, wherein the branded 3D digital asset is displayed on a client machine, and wherein the client machine is configured to transmit data related to user interaction or viewability with the branded 3D digital asset to the computing device using event scripts, the client machine further performing:

displaying the branded 3D digital asset in the 3D online environment, determining a proportion of the branded 3D digital asset on screen of a graphical user interface, obtaining a percentage of the screen of the graphical user interface that the branded 3D digital asset is covering using a screen bounding function of a 3D engine of the 3D online environment to generate the data related to user interaction or viewability with the branded 3D digital asset, and transmitting the data related to user interaction or viewability with the branded 3D digital asset to the computing device;

determining, by the computing device, whether the objective has been achieved by the user, wherein the determining includes evaluating a user engagement score (UES) and comparing the UES with the engagement rule, wherein the UES is derived, at least in part, from the data related to user interaction or viewability with the branded 3D digital asset; and upon the determining, by the computing device, preventing display of the branded 3D digital asset to the user, and wherein preventing display of the branded 3D digital asset occurs for a predetermined period of time.

2. The method of claim 1, further comprising:
displaying another branded 3D digital asset associated with the advertiser for the predetermined period of time.

3. The method of claim 1, wherein the branded 3D digital asset was placed within the 3D online environment by a game developer as a generic 3D digital asset, the generic 3D digital asset comprising a generic asset, and wherein the advertiser replaced the generic asset with a branded asset to generate the branded 3D digital asset, the branded asset graphically representing a branded product or service offered by the advertiser.

4. The method of claim 1, wherein the preventing occurs across multiple 3D environments or platforms on one or more graphical user interfaces associated with the user.

5. The method of claim 1, wherein the advertiser can provide the objective for the branded 3D digital asset across multiple 3D environments or platforms for a plurality of users.

6. The method of claim 1, wherein the UES includes data related to at least one of a purchase action, a social media like action, a social media post action, or a get coupon action performed by the user.

7. The method of claim 1, wherein the UES is represented by an alpha-numeric string, and wherein the UES represents a collective value for user interaction or viewability related to the branded 3D digital asset.

8. The method of claim 1, wherein the UES is at least represented by a string comprising:

eUx.vy.ts.in.pm wherein e represents a user engagement identifier related to the branded 3D digital asset, U represents a value representing a number of engagement features that are displayed to the user, x represents a number of engagement features that were utilized by the user, v represents a viewability identifier related to branded 3D digital asset, y represents a size of the branded 3D digital asset with respect to at least one display of the graphical user interface, t represents a time identifier related to the branded 3D digital asset, s represents a number of seconds the user interacted with, or viewed, the branded 3D digital asset, i represents a user intent identifier related to the branded 3D digital asset, n is a variable representing whether an intent of the user was fulfilled, p represents a purchase identifier related to the branded 3D digital asset, and m is a variable representing whether the user purchased a service or product represented by the branded 3D digital asset, and wherein the period symbol (.) represents a separator identifier (delimiter) between various data transmitted within the UES related to the branded 3D digital asset.

9. A non-transitory computer readable medium comprising instructions which when executed by a processing system, including at least one core, performs a method to display advertisements in three dimensional (3D) online environment based on an objective of an advertiser, comprising:

receiving the objective of the advertiser, wherein the objective determines when to stop displaying a branded 3D digital asset to a user in the 3D online environment, the objective including an engagement rule, wherein the branded 3D digital asset is displayed on a client machine, and wherein the client machine is configured to transmit data related to user interaction or viewability with the branded 3D digital asset to the processing system using event scripts, the client machine further performing:

displaying the branded 3D digital asset in the 3D online environment, determining a proportion of the branded 3D digital asset on screen of a graphical user interface, obtaining a percentage of the screen of the graphical user interface that the branded 3D digital asset is covering using a screen bounding function of a 3D engine of the 3D online environment to generate the data related to user interaction or viewability with the branded 3D digital asset, and transmitting the data related to user interaction or viewability with the branded 3D digital asset to the processing system;

determining whether the objective has been achieved by the user, wherein the determining includes evaluating a user engagement score (UES) and comparing the UES with the engagement rule, wherein the UES is derived, at least in part, from the data related to user interaction or viewability with the branded 3D digital asset; and upon the determining, preventing display of the branded 3D digital asset to the user, and wherein preventing display of the branded 3D digital asset occurs for a predetermined period of time, wherein the method is performed by the processing system.

10. The non-transitory computer readable medium of claim 9, further comprising:
displaying another branded 3D digital asset associated with the advertiser for the predetermined period of time.

11. The non-transitory computer readable medium of claim 9, wherein the branded 3D digital asset was placed within the 3D online environment by a game developer as a generic 3D digital asset, the generic 3D digital asset comprising a generic asset, and wherein the advertiser replaced the generic asset with a branded asset to generate the branded 3D digital asset, the branded asset graphically representing a branded product or service offered by the advertiser.

12. The non-transitory computer readable medium of claim 9, wherein the preventing occurs across multiple 3D environments or platforms on one or more user interfaces associated with the user.

13. The non-transitory computer readable medium of claim 9, wherein the advertiser can provide the objective for the branded 3D digital asset across multiple 3D environments or platforms for a plurality of users.

14. The non-transitory computer readable medium of claim 9, wherein the UES includes data related to at least one of a purchase action, a social media like action, a social media post action, or a get coupon action performed by the user.

15. The non-transitory computer readable medium of claim 9, wherein the UES is represented by an alpha-numeric string, and wherein the UES represents a collective value for user interaction or viewability related to the branded 3D digital asset.

16. The non-transitory computer readable medium of claim 9, wherein the UES is at least represented by a string comprising:
eUx.vy.ts.in.pm
wherein e represents a user engagement identifier related to the branded 3D digital asset, U represents a value representing a number of engagement features that are displayed to the user, x represents a number of engagement features that were utilized by the user, v represents a viewability identifier related to branded 3D digital asset, y represents a size of the branded 3D digital asset with respect to at least one display of the graphical user interface, t represents a time identifier related to the branded 3D digital asset, s represents a number of seconds the user interacted with, or viewed, the branded 3D digital asset, i represents a user intent identifier related to the branded 3D digital asset, n is a variable representing whether an intent of the user was fulfilled, p represents a purchase identifier related to the branded 3D digital asset, and m is a variable representing whether the user purchased a service or product represented by the branded 3D digital asset, and wherein the period symbol (.) represents a separator identifier (delimiter) between various data transmitted within the UES related to the branded 3D digital asset.

17. A system to display advertisements in three dimensional (3D) online environment based on an objective of an advertiser, the system comprising:
a client machine configured to:
display a branded 3D digital asset to a user, on a graphical user interface, in the 3D online environment,
determine a proportion of the branded 3D digital asset on screen of the graphical user interface,
obtain a percentage of the screen of the graphical user interface that the branded 3D digital asset is covering using a screen bounding function of a 3D engine of the 3D online environment to generate data related to user interaction or view ability with the branded 3D digital asset, and
transmit the data related to user interaction or viewability with the branded 3D digital asset using event scripts associated with the branded 3D digital asset; and
a computing device configured to:
receive the objective of the advertiser, wherein the objective determines when to stop displaying a branded 3D digital asset to a user in the 3D online environment, and wherein the objective includes an engagement rule,
determine whether the objective has been achieved by the user, wherein the determination whether the objective has been achieved includes evaluating a user engagement score (UES) and comparing the UES with the engagement rule, wherein the UES is derived, at least in part, from the data related to user interaction or viewability with the branded 3D digital asset, and
prevent display of the branded 3D digital asset to the user upon the determination that the objective has been achieved, wherein the prevention of displaying of the branded 3D digital asset occurs for a predetermined period of time.

18. The system of claim 17, further configure to:
display another branded 3D digital asset associated with the advertiser for the predetermined period of time.

19. The system of claim 17, wherein the branded 3D digital asset was placed within the 3D online environment by a game developer as a generic 3D digital asset, the generic 3D digital asset comprising a generic asset, and wherein the advertiser replaced the generic asset with a branded asset to generate the branded 3D digital asset, the branded asset graphically representing a branded product or service offered by the advertiser.

20. The system of claim 17, wherein the prevention of displaying of the branded 3D digital asset occurs across multiple 3D environments or platforms on one or more user interfaces associated with the user.

21. The system of claim 17, wherein the advertiser can provide the objective for the branded 3D digital asset across multiple 3D environments or platforms for a plurality of users.

22. The system of claim 17, wherein the UES includes data related to at least one of a purchase action, a social media like action, a social media post action, or a get coupon action.

23. The system of claim 17, wherein the UES is represented by an alpha-numeric string, and wherein the UES represents a collective value for user interaction or viewability related to the branded 3D digital asset.

24. The system of claim 17, wherein the UES is at least represented by a string comprising:
eUx.vy.ts.in.pm
wherein e represents a user engagement identifier related to the branded 3D digital asset, U represents a value representing a number of engagement features that are displayed to the user, x represents a number of engagement features that were utilized by the user, v represents a viewability identifier related to branded 3D digital asset, y represents a size of the branded 3D digital asset with respect to at least one display of the graphical user interface, t represents a time identifier related to the branded 3D digital asset, s represents a number of seconds the user interacted with, or viewed, the branded 3D digital asset, i represents a user intent identifier related to the branded 3D digital asset, n is a variable representing whether an intent of the user was fulfilled, p represents a purchase identifier related to the branded 3D digital asset, and m is a variable representing whether the user purchased a service or product represented by the branded 3D digital asset, and wherein the period symbol (.) represents a separator identifier (delimiter) between various data transmitted within the UES related to the branded 3D digital asset.

* * * * *